(12) United States Patent
Menon et al.

(10) Patent No.: US 12,380,790 B2
(45) Date of Patent: Aug. 5, 2025

(54) VOICE ACTIVATION OF AN ALARM VIA A COMMUNICATION NETWORK

(71) Applicant: Orange, Paris (FR)

(72) Inventors: Bruno Menon, Châtillon (FR); Jonathan Deman, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 522 days.

(21) Appl. No.: 17/299,243

(22) PCT Filed: Nov. 18, 2019

(86) PCT No.: PCT/FR2019/052737
§ 371 (c)(1),
(2) Date: Jun. 2, 2021

(87) PCT Pub. No.: WO2020/115380
PCT Pub. Date: Jun. 11, 2020

(65) Prior Publication Data
US 2022/0130224 A1 Apr. 28, 2022

(30) Foreign Application Priority Data
Dec. 4, 2018 (FR) ...................................... 1872283

(51) Int. Cl.
*G08B 21/04* (2006.01)
*G08B 25/00* (2006.01)
(Continued)

(52) U.S. Cl.
CPC ....... *G08B 21/0469* (2013.01); *G08B 25/005* (2013.01); *G10L 15/08* (2013.01);
(Continued)

(58) Field of Classification Search
None
See application file for complete search history.

(56) References Cited

U.S. PATENT DOCUMENTS 6,313,743 B1 * 11/2001 Abraham-Fuchs .... G08B 21/02
340/567
6,628,200 B1 * 9/2003 Lin ..................... H04L 12/2854
340/568.1
(Continued)

FOREIGN PATENT DOCUMENTS

FR      2968815 A1      6/2012
FR      3064659 A1 *   10/2018 ............... B62H 3/08
WO   WO 2014/155152 A1  10/2014

OTHER PUBLICATIONS

International Search Report and Written Opinion dated Mar. 5, 2020 for Application No. PCT/FR2019/052737.

*Primary Examiner* — Muhammad Adnan
(74) *Attorney, Agent, or Firm* — Knobbe, Martens, Olson & Bear, LLP

(57) ABSTRACT

A method for activating an alarm is described. The method is performed by an alarm device connected to a communication network and arranged in the vicinity of a user. The method includes receiving voice data generated by the user, comparing the received voice data with voice data recorded in the alarm device, and, when the received voice data matches recorded voice data, transmitting to a server, via the communication network, textual information known to the server, in order to request assistance for the user, the textual information being non-representative of the voice data generated by the user.

15 Claims, 4 Drawing Sheets

Figure 1:
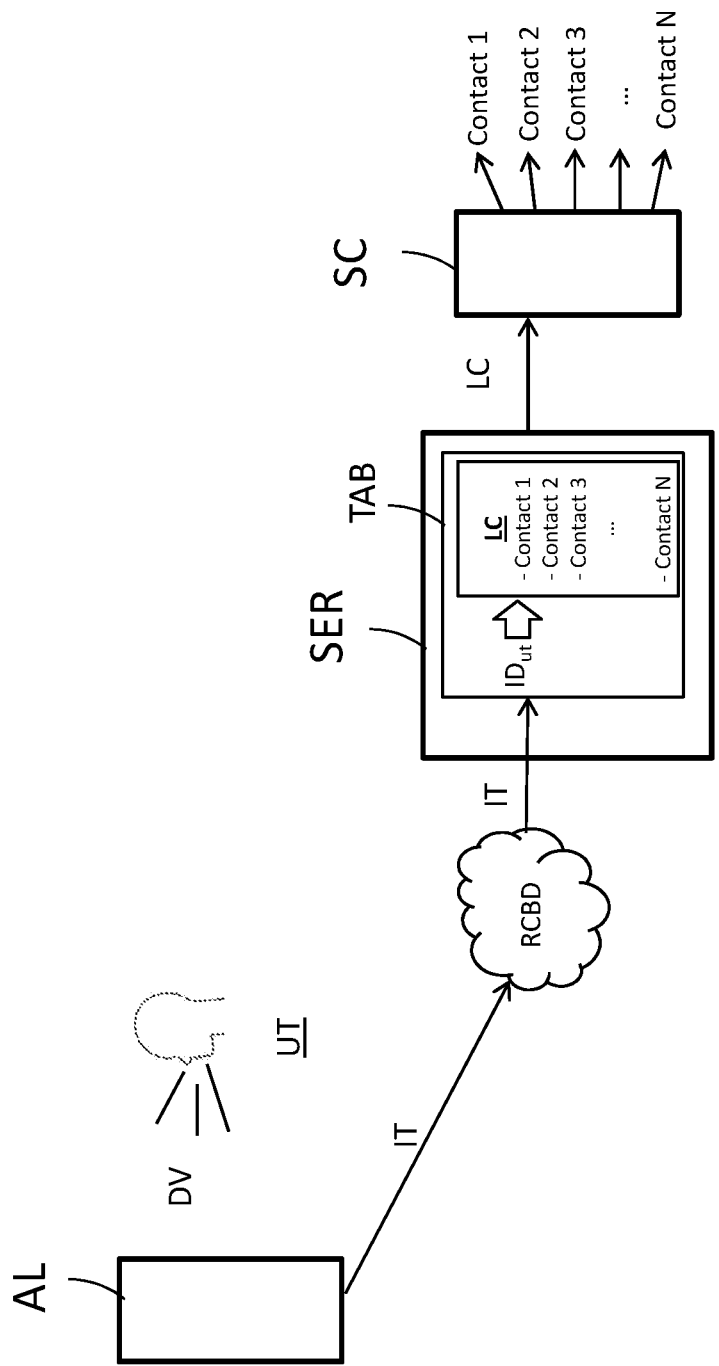

(51) Int. Cl.
  *G10L 15/08* (2006.01)
  *G10L 15/22* (2006.01)
  *G10L 15/26* (2006.01)
(52) U.S. Cl.
  CPC .............. *G10L 15/22* (2013.01); *G10L 15/26* (2013.01); *G10L 2015/088* (2013.01); *G10L 2015/223* (2013.01)

(56) References Cited

U.S. PATENT DOCUMENTS

| | | | | |
|---|---|---|---|---|
| 6,631,179 | B1* | 10/2003 | Sifuentes | H04M 1/271 379/159 |
| 7,212,111 | B2* | 5/2007 | Tupler | G08B 27/001 340/539.18 |
| 10,610,111 | B1* | 4/2020 | Tran | A61B 5/296 |
| 10,728,336 | B2* | 7/2020 | Akhtar | G06Q 10/087 |
| 10,856,116 | B1* | 12/2020 | Klein | H04W 4/021 |
| 2005/0256712 | A1* | 11/2005 | Yamada | G10L 15/065 704/E15.009 |
| 2006/0028337 | A1* | 2/2006 | Li | H04N 21/42203 340/539.1 |
| 2007/0057798 | A1* | 3/2007 | Li | G08B 25/016 340/573.1 |
| 2015/0302854 | A1* | 10/2015 | Clough | G16H 40/67 704/275 |
| 2015/0307829 | A1* | 10/2015 | Dedry | C12M 23/52 435/307.1 |
| 2016/0345150 | A1* | 11/2016 | Shim | H04W 76/50 |
| 2017/0215208 | A1* | 7/2017 | Burnham | G16H 10/60 |
| 2018/0047414 | A1* | 2/2018 | Kasilya Sudarsan | G08B 21/18 |
| 2018/0139070 | A1* | 5/2018 | Lin | H04L 12/2825 |
| 2018/0337814 | A1* | 11/2018 | Hassan | H04L 27/0008 |
| 2018/0367943 | A1* | 12/2018 | Pipes | H04W 4/02 |
| 2019/0068784 | A1* | 2/2019 | Reddy | H04M 3/5116 |
| 2019/0175104 | A1* | 6/2019 | Malik | A61B 5/145 |
| 2021/0059542 | A1* | 3/2021 | Gopalakrishnan | G16H 20/70 |
| 2021/0176812 | A1* | 6/2021 | Tippens | H03M 7/30 |

* cited by examiner

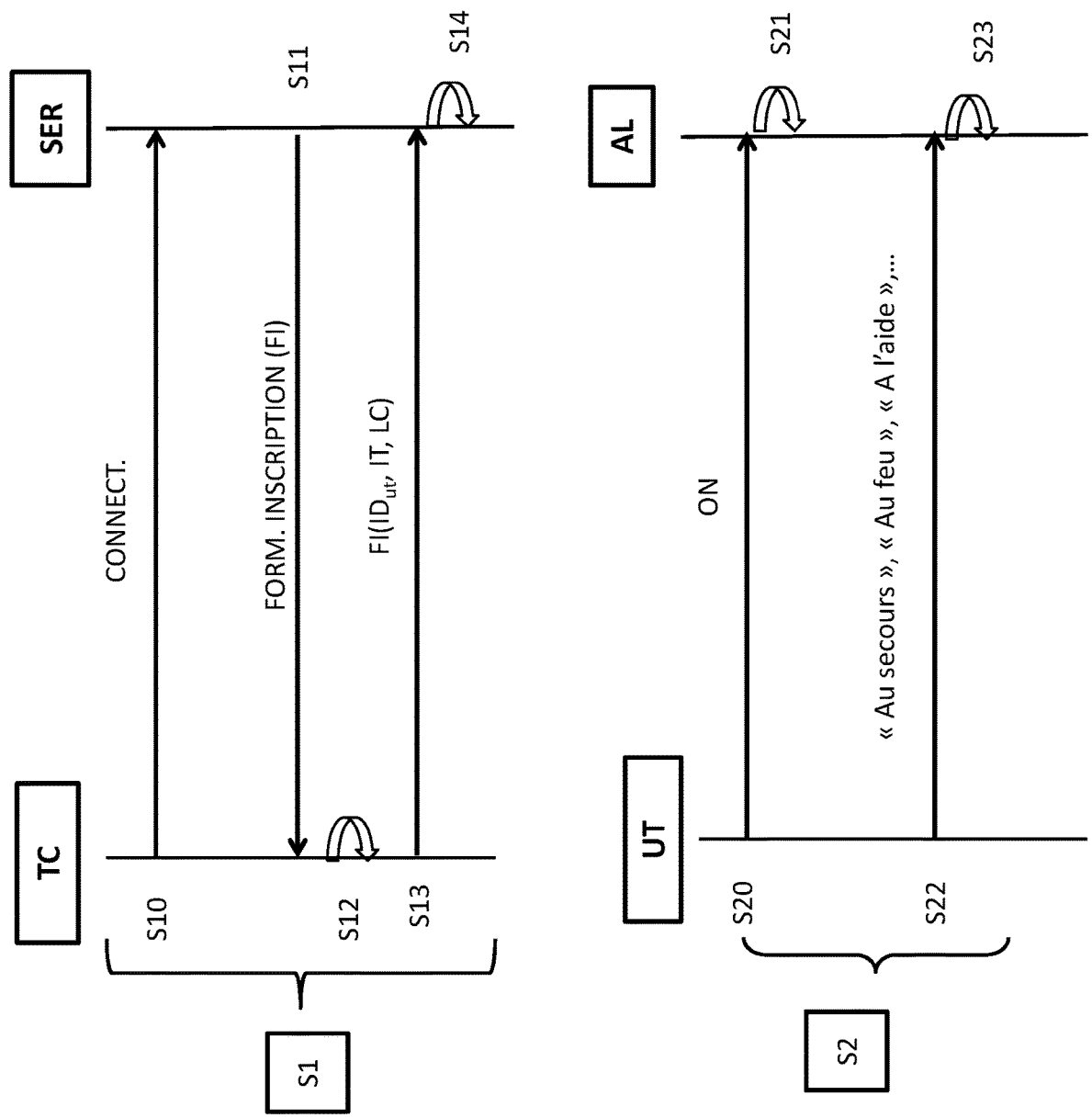

VOICE ACTIVATION OF AN ALARM VIA A COMMUNICATION NETWORK

RELATED APPLICATIONS

This application is the U.S. National Phase of Application No. PCT/FR2019/052737 entitled "VOICE ACTIVATION OF AN ALARM VIA A COMMUNICATION NETWORK" and filed Nov. 18, 2019, which claims the benefit of French Patent Application No. 1872283, filed Dec. 4, 2018, each of which is incorporated by reference in its entirety.

1. FIELD OF THE INVENTION

The present invention relates in general to the field of assisting people, and more particularly to the activation of an alarm by these people, in the event of problems occurring in their home.

2. PRIOR ART

There are at present some telecommunications appliances in which a calling user uses a specific device to initiate telephone dialing corresponding to a particular correspondent in order to alert said correspondent to an incident affecting the user. These appliances are used in the context of a landline or mobile telephone network by housebound elderly or disabled people to alert emergency services (ambulance service, fire brigade, etc.). They take the form of an object having a single button and that is carried or worn by the person, or else the form of a clearly demarcated button on a landline or mobile telephone keypad.

The drawback of this type of appliance is that the user has to perform an action on it in order to call for help, whether or not said appliance is portable. Such appliances are thus not suitable in an emergency, since the user may stop thinking rationally, panic and no longer know how to operate the appliance. Since this is a portable appliance, the drawback is that the user may decline to carry or wear it or even forget to carry or wear it.

Moreover, these appliances require a connection to a landline or mobile network, meaning that the user has to pay a relatively expensive subscription in order to be able to communicate via such a network. Another drawback of this type of network is that it may easily be deactivated by a malicious individual. Specifically, if the landline telephone network is involved, it is enough for the malicious individual to cut the wires connecting the user's telephone to this network. If a 3G, 4G or 5G mobile telephone network is involved, the malicious individual may quite simply force the user to hand over his telephone, his tablet or the like. Finally, in the case of a data communication network, for example the Internet, the malicious individual may switch off the power, having the effect of deactivating this network. The malicious individual may also physically prevent the user from using the means for communication, via this network, that are available to him. The user is thus no longer able to use his appliance.

3. AIM AND SUMMARY OF THE INVENTION

One of the aims of the invention is to rectify drawbacks of the abovementioned prior art.

To this end, one subject of the present invention relates to an alarm activation method, characterized in that it comprises the following, in an alarm device connected to a communication network and arranged close to a user:

receiving voice data generated by the user,
comparing the received voice data with voice data recorded in the alarm device,
the received voice data corresponding to recorded voice data, transmitting, to a server, via the communication network, textual information known to the server in order to request assistance for the user, the textual information not being representative of the voice data generated by the user.

Such an alarm activation method has the advantage of being easy to implement for a user. Specifically, said user does not have to worry about carrying or wearing an alarm activation device, such as a pendant, fob, bracelet, etc., thereby greatly simplifying use thereof. The alarm activation method according to the invention is furthermore far more secure and far less intrusive than existing alarm activation methods, since it is textual information that is transmitted to a server, and not directly the words spoken by the user. Such textual information furthermore advantageously does not reveal either the words spoken by the user or the reasons why the user activated the alarm.

According to one particular embodiment, the communication network is a low-speed network.

The fact that such an alarm activation method uses a low-speed communication network, rather than a high-speed communication network, such as the Internet for example, means that the user does not have to have a modem or a router, and greatly simplifies the configuration of the alarm activation method.

According to one particular embodiment, the voice data that are compared are audio data.

The voice data generated by the user are thus compared directly with the voice data recorded beforehand, and it is not necessary to apply a voice recognition method to the generated voice data. Such an embodiment is therefore inexpensive in terms of computing resources.

According to one particular embodiment, the voice data that are compared are text data.

To this end, the generated voice data are transcribed in textual form before being compared with recorded voice data, which have also been transcribed in textual form.

Such an embodiment makes it possible to generate a keyword representative of the reasons why the user triggered the alarm (start of a fire, theft, assault, discomfort, etc.), such a keyword being able to be transmitted to the server, without disclosing the user's voiceprint in doing so.

According to another particular embodiment, the voice data correspond to a keyword.

By virtue of such an embodiment, the user just has to speak a keyword in order to activate the alarm, thereby simplifying the implementation of the alarm activation method as much as possible for less technically oriented or fragile people, such as for example the elderly. Such a keyword is a word commonly used in an emergency, such as for example "help", "emergency", "fire", "thief", "SOS", etc.

According to another particular embodiment, the textual information is an identifier of the alarm device.

By virtue of such an embodiment, the identifier of the alarm device does not allow it to be fraudulently exploited by a third party, given that it is independent of any word likely to be spoken by the user or any personal identifier allowing contact to be established with the user. The user's biometric data (his voice) are thus advantageously made secret and protected.

According to another particular embodiment, the textual information is an identifier of the alarm device that is coupled to a textual transcription of the keyword implemented by the alarm device.

By virtue of such an embodiment, given that the textual transcription of the keyword spoken by the user is transmitted to the server in association with the identifier of the alarm device, the server is able to alert a third party who is as competent as possible for providing rapid assistance to the user. Thus, for example, if the textual transcription of the keyword is "fire", the server will be able to inform a person known to the user, for example a relative, that he should call the fire brigade. The security of the information transmitted to the server remains high, since no truly personal information, such as the user's voiceprint, is transmitted.

According to another particular embodiment, the textual information has been recorded on the server in association with a plurality of contacts from which assistance for the user may be requested.

Such an embodiment has the benefit of avoiding the user having to perform an action on a communication terminal (for example: telephone, tablet, computer) to request help and having to find which person to contact to provide assistance. Specifically, these operations are advantageously delegated to the server, which contains a record of the association between the identifier of the alarm device and a plurality of contacts of the user.

According to another particular embodiment, the contacts are classified in a given order.

Such an embodiment has the advantage of making it possible to contact one person at a time, in a predefined order, preferably in accordance with the wishes of the user. The contacts will for example be classified from the highest priority to the lowest priority to be contacted.

According to another particular embodiment, the contact classified in first place is a communication identifier of the user.

Such an embodiment advantageously makes it possible to check whether the alarm device has been activated by mistake by the user so as to send for help unnecessarily, and, in any event, to quickly establish contact with the user after activation of the alarm device.

The various abovementioned embodiments or implementation features may be added, independently or in combination with one another, to the alarm activation method defined above.

The invention also relates to an alarm device arranged close to a user, characterized in that it is connected to a communication network, the alarm device comprising a processor that is configured so as to implement the following:
  receive voice data generated by a user,
  compare the received voice data with voice data recorded in the alarm device,
  the received voice data corresponding to recorded voice data, transmit, to a server, via the communication network, textual information known to the server in order to request assistance for the user, the textual information not being representative of the voice data generated by the user.

Such an alarm device is in particular able to implement the abovementioned alarm activation method.

The invention also relates to a computer program comprising instructions for implementing the alarm activation method according to the invention, according to any one of the particular embodiments described above, when the program is executed by a processor.

This program may use any programming language and be in the form of source code, object code or intermediate code between source code and object code, such as in a partially compiled form, or in any other desirable form.

The invention also targets a computer-readable recording medium or information medium containing instructions of a computer program, such as mentioned above.

The recording medium may be any entity or device capable of storing the program. For example, the medium may contain a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet network.

As an alternative, the recording medium may be an integrated circuit in which the program is incorporated, the circuit being designed to execute or to be used in the execution of the abovementioned alarm activation method.

4. BRIEF DESCRIPTION OF THE DRAWINGS

Figure 2:
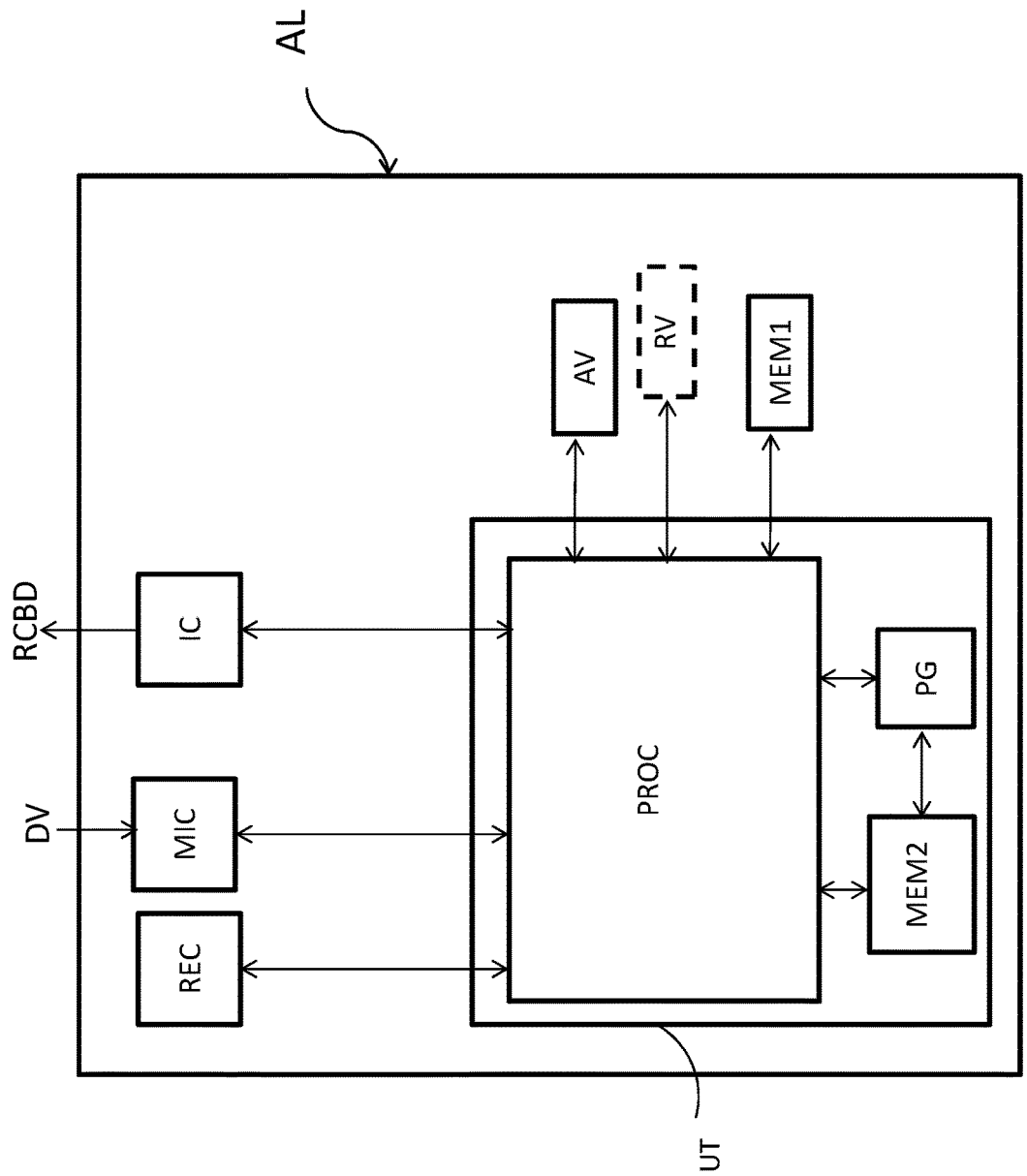
Figure 3B:
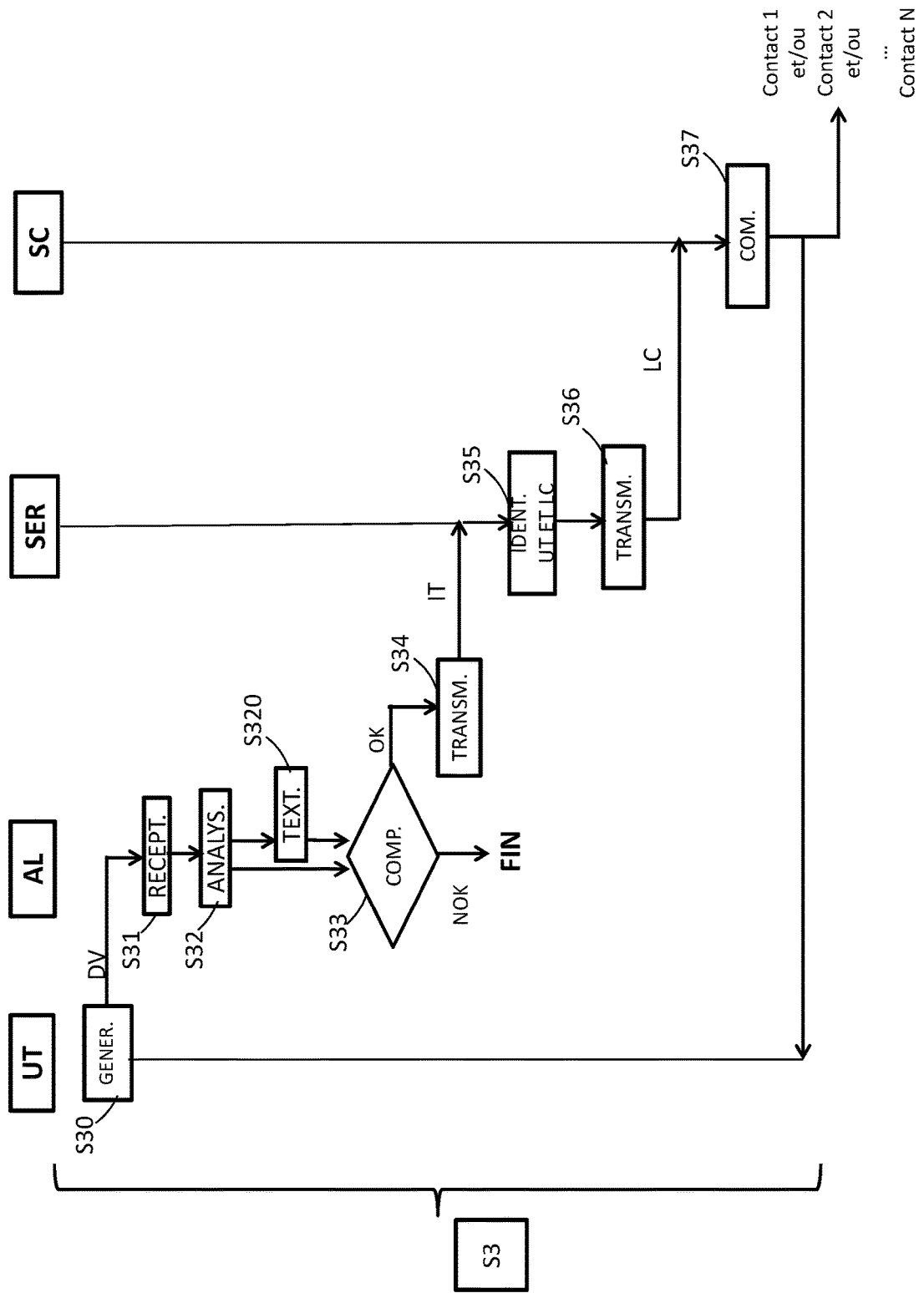

Other features and advantages will become apparent on reading particular embodiments of the invention, which are given by way of illustrative and non-limiting example, and the appended drawings, in which:

FIG. 1 is a schematic and general view of an architecture in which the alarm activation method is implemented in one particular embodiment of the invention, FIG. 2 shows an alarm device in one particular embodiment of the invention, FIGS. 3A and 3B show the main actions implemented in the alarm activation method according to one particular embodiment of the invention.

5. DETAILED DESCRIPTION OF ONE EMBODIMENT OF THE INVENTION

5.1 Architectural Environment

FIG. 1 shows an environment in which the alarm activation method according to the invention is implemented.

FIG. 1 shows:
an alarm device AL configured so as to:
  receive voice data DV generated by a user UT,
  compare the received voice data DV with voice data recorded in the alarm device,
  transmit textual information IT not representative of the received voice data DV, if these voice data correspond to recorded voice data,
a server SER configured so as to:
  receive the textual information IT from the alarm device,
  associate this information IT, in a correspondence table TAB stored in memory, with an identifier $ID_{ut}$ of the user UT, who is himself associated with a list of contacts LC containing N (N≥1) contacts "contact 1", "contact 2", "contact 3", . . . , "contact N", as previously defined by the user UT,
  transmit the list LC or else at least one contact from the list LC, a communication server SC configured so as to:
    receive the list LC or at least one contact from the list LC from the server SER,
    establish communication with a contact from the list LC.

According to one exemplary embodiment, the alarm device AL is installed in the home of the user UT, preferably in a room where the user UT is often located. The alarm device AL is operational when the user UT is a few meters away from it.

According to the invention, the alarm device AL and the server SER communicate with one another via a data communication network, for example a low-speed network RCBD, for example dedicated to the Internet of Things (IoT). Such a communication network is for example the LoRa®, Sigfox®, Qowisio®, etc. network.

As a variant, the data communication network may be an x-DSL, fiber or even cellular network (for example in accordance with the 2G (GSM, GPRS, EDGE), 3G (UMTS), 4G (LTE), LTE-A, LTE-M, WCDMA, CDMA2000, HSPA or 5G standards or their variants or evolutions), another type of radio network (for example Wi-Fi® or Bluetooth®), an IP (Internet Protocol) network, a combination of several of these networks, etc. The server SER and the communication server SC communicate with one another via any type of communication network (not shown). This may be for example an IP network or an x-DSL, fiber or even 3G, 4G, 5G, etc. network. If the servers SER and SC are close to one another, they may also communicate via a wireless local area network, in particular a Wi-Fi or PLC (abbreviation for "power line communication") network.

Although the servers SER and SC are separate in FIG. 1, they could be integrated together into a single entity.

The communication server SC is suitable for establishing communication with the contacts from the list LC via any type of network corresponding to the identifiers of these contacts. If for example contact 1 is associated with a landline telephone number, the server SC is configured so as to contain a communication interface with a switched network. If for example contact 1 is also associated with a mobile telephone number, the server SC is configured so as to contain a communication interface with a mobile telephone network. If for example contact 2 is associated with an instant messaging or e-mail identifier, the server SC is configured so as to contain a communication interface with a computer network, such as an Internet network.

5.2 Description of One Embodiment of the Alarm Device

FIG. 2 shows the simplified structure of the alarm device AL designed to implement the alarm activation method that will be described below.

Such an alarm device AL comprises:
- one or more microphones MIC, for example multidirectional microphones, configured so as to listen to the voice data DV generated by the user UT,
- a reception module REC for receiving the detected voice data DV,
- a memory MEM1 designed to store voice data recorded beforehand by the user UT,
- a voice analyzer AV,
- an optional voice recognition module RV that, because of its optional nature, is shown in dashed lines in FIG. 2,
- a connection interface IC that is designed to communicate, via the communication network RCBD, with the server SER from FIG. 1.

The alarm device AL is preferably battery-operated.

As a variant, the alarm device AL is supplied with electric power and contains a battery, which, in the event of disconnection of the electric power supply, is designed to have an autonomy of approximately 1 hour, for example.

Such an alarm device thus has a very simple structure. As a result, the alarm device is inexpensive to manufacture and therefore to market.

According to one particular embodiment of the invention, the actions carried out by the alarm activation method are implemented by instructions of a computer program PG. To this end, the alarm device AL has the conventional architecture of a computer and comprises in particular a memory MEM2, a processing unit UT, equipped for example with a processor PROC, and driven by the computer program PG stored in memory MEM2. The computer program PG comprises instructions for implementing the actions of the alarm activation method that will be described below, when the program is executed by the processor PROC, according to any one of the particular embodiments of the invention.

On initialization, the code instructions of the computer program PG are for example loaded into a RAM memory (not shown), before being executed by the processor PROC. The processor PROC of the processing unit UT implements in particular the actions of the alarm activation method according to the instructions of the computer program PG.

5.3 Description of One Embodiment of the Alarm Activation Method

With reference to FIGS. 3A and 3B, a description is now given of the sequence of an alarm activation method according to one embodiment of the invention, implemented by the alarm device AL shown in FIGS. 1 and 2.

Such an alarm activation method requires performing a preliminary configuration S1 of the alarm device AL.

To this end, with reference to FIG. 3A, the user UT connects in S10 to the server SER, via a communication terminal TC, so as to create an account.

The communication terminal TC is for example a mobile telephone, a smartphone, a tablet, a laptop computer, a personal computer (PC), etc.

The communication terminal TC connects to the server SER via any type of suitable communication network. According to one exemplary embodiment, the user UT connects to the server SER via an access link, said link having been communicated when the alarm device AL was purchased. The connection to the server SER may also be established via a dedicated application downloaded beforehand to the terminal TC.

In S11, the server SER sends an online registration form FI.

In S12, the user UT fills in the registration form and enters the following information:
- Last name and first name of the user UT,
- Communication identifier $ID_{ut}$ of the user UT: for example telephone number(s) and/or e-mail address(es) of the user UT,
- Textual information IT: for example a word in everyday language, a series of numbers and/or letters chosen by the user UT, or even the identifier $ID_{al}$ of the alarm device AL, such an identifier being for example affixed to the alarm device AL,
- the list LC of contacts of the user UT.

Such a list LC contains N contacts well known to the user UT and that are preferably close enough to said user to intervene rapidly at his home in the event of alarm activation of the alarm device AL. These may be for example close neighbors, a family member of the user UT, or even a support center, the doctor who treats the user UT, etc.

For each of the N contacts "contact 1", "contact 2", ..., "contact N", the user associates a name, an address, a preferred communication identifier (mobile telephone number, landline telephone number, e-mail address, instant messaging address, etc.), as well as a schedule of their availability.

According to one particular embodiment, the N contacts are classified in order of priority to be contacted, the first contact "contact 1" from the list LC being the one who will be contacted first, the second contact "contact 2" from the list LC being the one who will be contacted second if it is impossible to reach the contact "contact 1" or else if said contact 1 declines/is not able to assist the user UT, etc.

According to one particular embodiment, the first "contact 1" is the user UT, and is therefore associated with one or more communication identifier(s) of the user UT. Thus, in the event of activation of the alarm device AL, the user UT will be contacted first so as to check whether the alarm device AL has been activated by mistake by the user UT, so as to avoid sending for help unnecessarily, and, in any event, to quickly establish contact with the user UT after activation of the alarm device AL.

In S13, the communication terminal TC transmits the filled-in registration form FI to the server SER.

In S14, the server SER records, in a correspondence table TAB, the information entered in the registration form FI, thereby ending the procedure of registering the user UT with the alarm activation service offered by the server SER.

In a second configuration phase S2, the user UT turns on the alarm device AL in S20, for example using a button provided for this purpose.

In S21, the alarm device AL starts listening following activation of the one or more microphones MIC.

In S22, the user UT then speaks several keywords DV, around ten for example. Such keywords are words in everyday language that express a state of distress, for example "Emergency", "Help", "Fire", "SOS", etc.

In S23, these keywords are detected by the microphone(s) MIC, received by the reception module REC, analyzed by the voice analyzer AV, and then recorded in the memory MEM1.

If the alarm device AL does not have a voice recognition module, the keywords are recorded in the memory MEM1, directly in an audio format, in S23.

If the alarm device AL comprises the voice recognition module RV, the keywords that are analyzed by the voice analyzer AV are transcribed in textual form by the voice recognition module RV. The keywords thus transcribed in textual form are then recorded in the memory MEM1 in S23.

At the end of the configuration phase S2, the alarm device AL is then operational. In order to ensure correct operation thereof, a test may be performed, the user UT speaking one of the recorded keywords.

A description will now be given, with reference to FIG. 3B, of the sequence of the alarm activation method according to the invention.

In S30, the user UT is close to the alarm device AL whose microphone(s) are activated and generates voice data DV. If the user UT is in distress, such voice data DV are for example a keyword of the type "Emergency", "Help", "Fire", etc., which are detected by the microphone(s) MIC of the alarm device AL.

In S31, the receiver REC of the alarm device AL receives the keyword spoken by the user UT.

In S32, voice analysis is performed on the keyword received by the voice analyzer AV.

If the alarm device AL does not comprise a voice recognition module, the received keyword is compared directly in S33 with the keywords recorded beforehand in audio format in the memory MEM1 in S23.

If the alarm device AL comprises a voice recognition module RV, in S320, this transcribes the received keyword in text format.

If none of the keywords recorded in audio format, respectively in text format, corresponds to the keyword received in audio format, respectively converted into text format, the alarm activation method is ended, the alarm device AL then awaiting the detection of new voice data generated by the user UT.

If there is a match, the alarm device AL, via its communication interface IC, transmits the textual information IT, recorded in S14 by the server SER, to the server SER in S34 via the communication network RCBD in order to request assistance for the user UT. In the preferred exemplary embodiment, this is the identifier $ID_{AL}$ of the alarm device AL. In this example, no information openly describing the reasons why the user UT triggered an alarm is transmitted, thereby making the alarm activation method particularly secure since it safeguards against disclosure of the user's "sensitive" personal data to third parties.

According to another embodiment, if the alarm device AL comprises a voice recognition module RV, the textual information IT transmitted to the server SER in S34 is the identifier $ID_{AL}$ of the alarm device coupled to the received keyword as transcribed in textual form in S320.

In S35, the server SER receives the identifier $ID_{AL}$, possibly coupled with the keyword transcribed in textual form, and identifies, in its correspondence table TAB, the coordinates of the user UT, as well as the list of contacts LC.

In S36, the server SER transmits the list LC to the communication server SC from FIG. 1. As a variant, the server SER could firstly transmit the first contact "contact 1" from the list LC and, upon request from the server SC, transmit the second contact "contact 2", and so on.

If the user UT was mentioned first in the list of contacts LC, the communication server SC establishes communication with the user UT using one of the communication identifiers $ID_{ut}$ of the user UT that are mentioned in the list LC.

If the user UT was not mentioned in the list of contacts LC, the communication server SC establishes communication with one of the contacts from the list LC, preferably the first contact "contact 1" from the list LC, using one of the communication identifiers of the contact "contact 1" that are mentioned in the list LC. For example, if such a communication identifier is a telephone number associated with the contact "contact 1", the server SC telephones the contact "contact 1" and plays to him an audio message of the type: "Mr. UT who lives at the address "15 rue des oiseaux, Boulogne" has activated his alarm device AL. If you agree to respond by visiting his address, press 1, otherwise hang up."

If the contact "contact 1" hangs up, the communication server SC establishes a new communication with the contact "contact 2" mentioned in the list LC, and so on, until a contact from the list LC responds that he agrees to assist the user UT.

It goes without saying that the embodiments described above have been given purely by way of completely non-limiting indication, and that numerous modifications may be easily made by a person skilled in the art without otherwise departing from the scope of the invention.

The invention claimed is:

1. An alarm activation method, the method performed by an alarm device connected to a communication network, the method comprising:

upon receiving voice data of a user, corresponding to voice data a keyword recorded in the alarm device, transmitting to a server, via the communication network, textual information known to the server in order to request assistance for the user, the textual information being coupled with the received voice data without revealing the content of the received voice data, wherein the communication network is a low-speed network dedicated to the Internet of Things.

2. The method of claim 1, wherein the voice data that are compared are audio data.

3. The method of claim 1, wherein the received voice data are transcribed into textual data before being compared to the recorded voice data.

4. The method of claim 1, wherein the voice data correspond to a keyword.

5. The method of claim 1, wherein the textual information is an identifier of the alarm device.

6. The method of claim 1, wherein the textual information is an identifier of the alarm device that is coupled to a textual transcription of the keyword implemented by the alarm device.

7. The method of claim 1, wherein the textual information has been recorded on the server in association with a plurality of contacts from which assistance for the user may be requested.

8. The method of claim 7, wherein the contacts are classified in a given order.

9. The method of claim 8, wherein the contact classified in first place is a communication identifier of the user.

10. An alarm device configured to be arranged close to a user and connected to a communication network, the alarm device comprising a processor, the alarm device configured to:

upon receiving voice data of a user, corresponding to a keyword voice data recorded in the alarm device, transmit, to a server, via the communication network, textual information known to the server in order to request assistance for the user, the textual information being coupled with the received voice data without revealing the content of the received voice data, wherein the communication network is a low-speed network dedicated to the Internet of Things.

11. A computer program stored on a non-transitory, computer readable medium, the computer program comprising instructions which, when executed on a processor, cause the processor to implement the method of claim 1.

12. A non-transitory, computer-readable storage medium having stored thereon instructions which, when executed by a processor, cause the processor to perform the method of claim 1.

13. The method of claim 1, wherein the textual information does not reveal words spoken by the user in the received voice data.

14. The method of claim 1, wherein the textual information does not reveal a reason why the user intended to activate the alarm.

15. An alarm activation method, the method performed by an alarm device connected to a communication network, the method comprising:

upon receiving voice data of a user corresponding to a keyword voice data recorded in the alarm device, transmitting, to a server, via the communication network, textual information known to the server in order to request assistance for the user, the textual information being coupled with the received voice data without revealing the content of the received voice data, wherein the textual information does not reveal words spoken by the user in the received voice and does not reveal a reason why the user intended to activate the alarm.

* * * * *